United States Patent [19]

Lavin

[11] Patent Number: 5,400,142
[45] Date of Patent: Mar. 21, 1995

[54] FIBER OPTIC ANGULAR RATE SENSOR INCLUDING DIGITAL PHASE MODULATION

[75] Inventor: Thomas J. Lavin, Wilmington, N.C.

[73] Assignee: AlliedSignal Inc., Morris Township, Morris County, N.J.

[21] Appl. No.: 237,526

[22] Filed: May 3, 1994

[51] Int. Cl.6 ............................................. G01C 19/64
[52] U.S. Cl. ........................................ 356/350; 385/3; 385/12
[58] Field of Search ................ 356/349, 350; 385/1–3, 385/12, 13, 14, 16

[56] References Cited

U.S. PATENT DOCUMENTS

| | | | |
|---|---|---|---|
| 5,116,127 | 5/1992 | Gröllmann | 356/350 |
| 5,123,741 | 6/1992 | Spahlinger | 356/350 |
| 5,214,488 | 5/1993 | Büschelberger et al. | 356/350 |
| 5,278,631 | 1/1994 | Hollinger et al. | 356/350 |
| 5,280,339 | 1/1994 | Hollinger et al. | 356/350 |

*Primary Examiner*—John D. Lee
*Attorney, Agent, or Firm*—Howard G. Massung

[57] ABSTRACT

A digital phase modulation arrangement for a fiber optic angular rate sensor utilizes Pockels electro-optical effect operating in the transverse mode. Light travels around a fiber optic coil in clockwise and counterclockwise directions. An error signal corresponding to the phase difference between the clockwise and counterclockwise traveling light is applied to a digital processor which provides a plurality of logic bits. The logic bits are applied to voltage/phase transducers arranged on an integrated optics chip. The voltage/phase transducers are switched from an applied reference voltage to a particular voltage level to induce a phase change through Pockels electro-optical effect.

8 Claims, 3 Drawing Sheets

FIBER OPTIC ANGULAR RATE SENSOR INCLUDING DIGITAL PHASE MODULATION

BACKGROUND OF THE INVENTION

This invention relates generally to phase modulation for fiber optic rate sensors. More particularly, this invention relates to a fiber optic rate sensor having a digital phase modulation capability, thereby eliminating the need for digital to analog conversion equipment as has heretofore been necessary.

The Pockels electro-optical effect operating in the transverse mode can be used to advantage in fiber optic angular rate sensors (gyroscopes) to provide light path phase modulating devices. These devices, i.e. integrated optics chips (IOC's) can be designed to exhibit a linear relationship between the level of an applied control voltage and the phase delay imparted to a confined light path. Typically, these devices use metallized pads on a prepared substrate. The pads are sized and positioned to provide a field strength level and orientation consistent with the intended modulation requirements. The present invention contemplates the use of specific metallized patterns of pads deposited on an optical crystal substrate to provide the digital phase modulation capability.

Lithium niobate and lithium tantalate are generally considered to be the most versatile crystals for all electro-optic applications. High optical quality lithium niobate and lithium tantalate both use the Pockels effect in the transverse voltage mode as light switches for phase modulating devices. In regard to the characteristics and applications of lithium niobate and lithium tantalate, reference is made to the data sheet issued in November, 1985 by Crystal Technology, Inc. of Palo Alto, Calif.

The Pockels effect is described at page 265 of the text "Optics" by Eugene Hecht and Alfred Zajoc, published by Addison-Wesley Publishing Company.

In a particular configuration, the effective index of refraction of a confined optical path is increased by the application of a voltage across two pads that straddle the confined optical path. The field pattern within a crystal substrate of lithium niobate, for example, resulting from this gradient is impressed across the axis of the confined propagation path. An arrangement such as this can be optimized for a nominal center frequency and bandwidth which produces a voltage related effect on the phase of light waves so as to be highly useable in fiber optics applications. One such use would be in fiber optic angular rate sensor or gyroscope (gyro) applications, where it is possible to null out the Sagnac induced phase changes produced in a fiber optic coil under the influence of a rotational rate.

Integrated optics chips of the type described have the ability to shift light phase in response to digital commands. The complexity of a separate digital to analog converter arrangement is undesirable, since it results in larger packages and noise sensitivity while decreasing reliability and performance stability.

Thus, the primary object of the present invention is to provide an arrangement for easily achieving a desireable digital phase modulation capability within an integrated optics chip without resorting to separate digital to analog voltage converter apparatus.

SUMMARY OF THE INVENTION

This invention contemplates a fiber optic angular rate sensor of the type wherein light from a light source is applied to an optical fiber via a coupler to a splitter/phase modulator, whereby the light is directed into both ends of a fiber optic sensing coil for traveling around the coil in clockwise and counterclockwise directions. Light exits the coil and is recombined by the splitter/phase modulator, and is thereupon applied to a detector via the coupler. The detector converts the light energy into an analog electrical error signal corresponding to the phase difference between the clockwise and the counterclockwise traveling light.

The error signal is applied through an analog to digital converter to a digital processor. The digital processor provides a plurality of logic bits which are applied to voltage to phase transducer means arranged as an integrated optics chip (IOC) including a plurality of switches or modulators, each of which is actuated by a logic bit from the digital processor to activate a voltage to phase transducer in a plurality of such transducers. The voltage to phase transducers have different gains. The arrangement is such that each of the voltage to phase transducers are switched from an applied reference voltage to a particular voltage level to induce a phase change through the Pockels electro-optical effect.

DETAILED DESCRIPTION OF THE INVENTION

Figure 1:
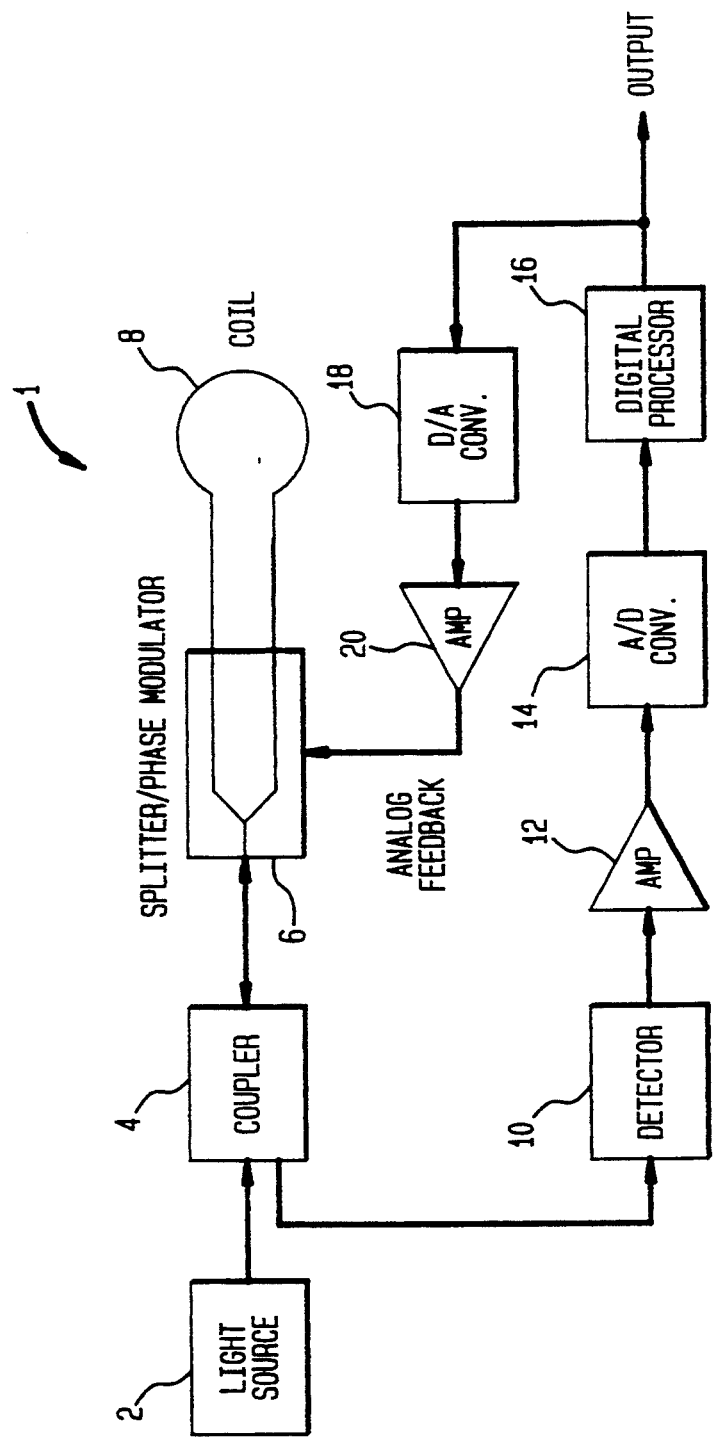
FIG. 1 is a block diagram illustrating a prior art angular rate sensor.

FIG. 1 illustrates a closed loop fiber optic angular rate sensor or gyroscope designated by the numeral 1. Light from a light source 2 is directed by an optical coupler 4 to a splitter/phase modulator 6 and therefrom into both ends of a fiber optic coil 8. Light exits coil 8 and is recombined in the splitter/phase modulator, and is applied via coupler 4 to a detector 10. Detector 10 converts the light energy into an electrical error signal which is amplified by an amplifier 12 and applied therefrom to an analog to digital converter 14. Analog to digital converter 14 converts the analog output from amplifier 12 to a digital output and applies the digital output to a digital processor 16. Digital processor 16 provides an output corresponding to angular rate sensed by angular rate sensor 1.

The output from digital processor 16 is applied to a digital to analog converter 18. Digital to analog converter 18 converts the digital output from digital processor 16 to an analog output and applies the analog output to an amplifier 20. Amplifier 20 provides an output which is applied to splitter/phase modulator 6 for controlling the phase modulation of the light applied thereto.

It will be recognized that the inclusion of digital to analog converter 18 in the arrangement described in FIG. 1 is undesirable, since it complicates thermal design, increases power dissipation, contributes to temperature gradients and hampers miniaturization of the angular rate sensor package.

Only as much of angular rate sensor 1 as is necessary to understand the present invention has been illustrated and described with reference to FIG. 1. Angular rate sensors of the type contemplated are more fully described in commonly assigned U.S. Pat. Nos. 5,278,631 and 5,280,339 issued to W. Hollinger, K. Killian and R. Kovacs on Jan. 11, 1994 and Jan. 18, 1994, respectively, said description being incorporated herein by reference.

Figure 2:
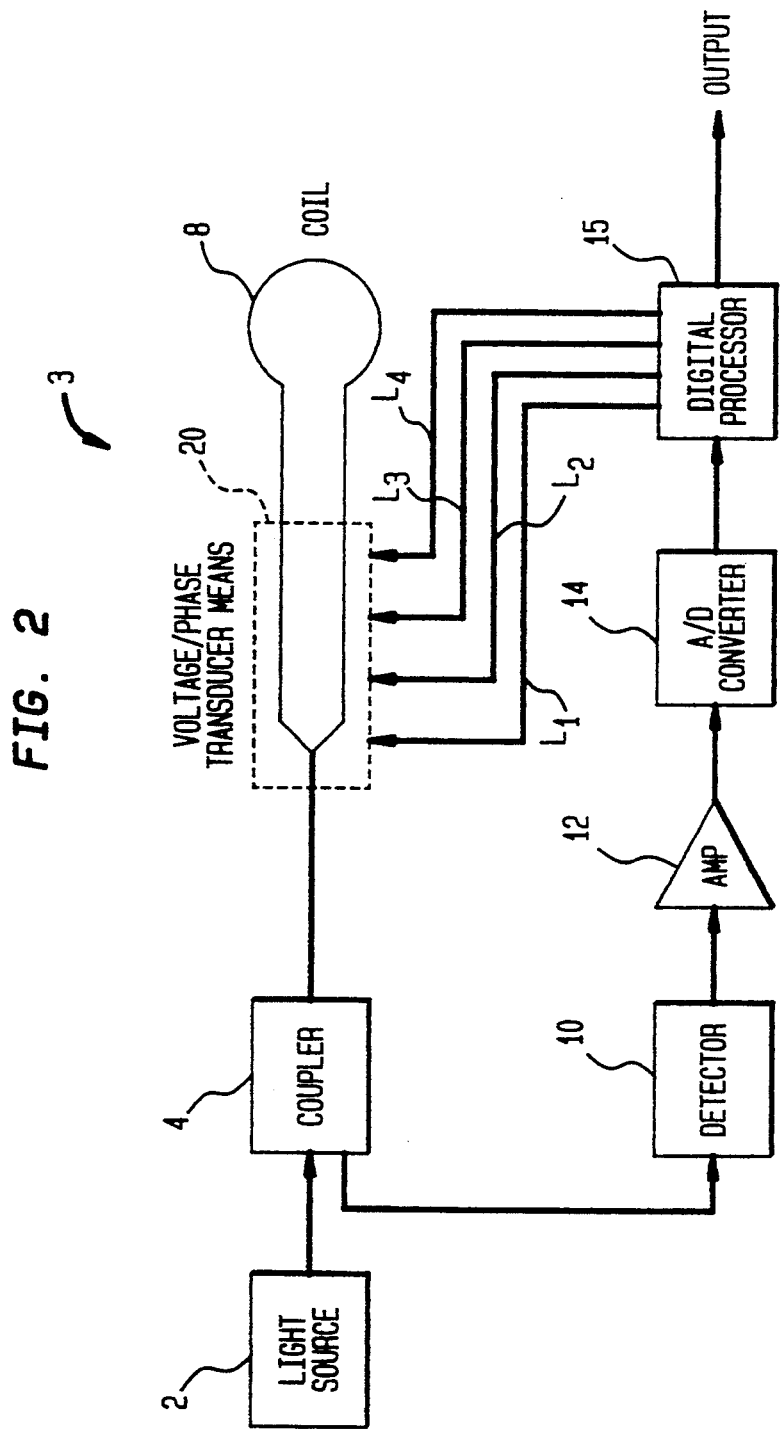
FIG. 2 is a block diagram illustrating an angular rate sensor according to the present invention and generally showing voltage to phase transducer means.

The aforementioned disadvantages of prior art angular rate sensors are obviated by the present invention as shown generally in FIG. 2, wherein an angular rate sensor is designated by the numeral 3 and elements corresponding to those in FIG. 1 carry corresponding numerical designations.

Thus, the output from analog to digital converter 14 is applied to a digital processor 18. Digital processor 18 provides an output corresponding to the angular rate sensed by an angular rate sensor 1A as does digital processor 16 shown in FIG. 1, and provides a plurality of logic bits shown for purposes of illustration as four in number and designated as $L_1$, $L_2$, $L_3$ and $L_4$. Logic bit $L_1$ is the least significant logic bit and logic bit $L_4$ is the most significant logic bit. Logic bits $L_1$, $L_2$, $L_3$ and $L_4$ are applied to a voltage/phase transducer means 20 to accomplish digital phase modulation as will be hereinafter described.

Figure 3:
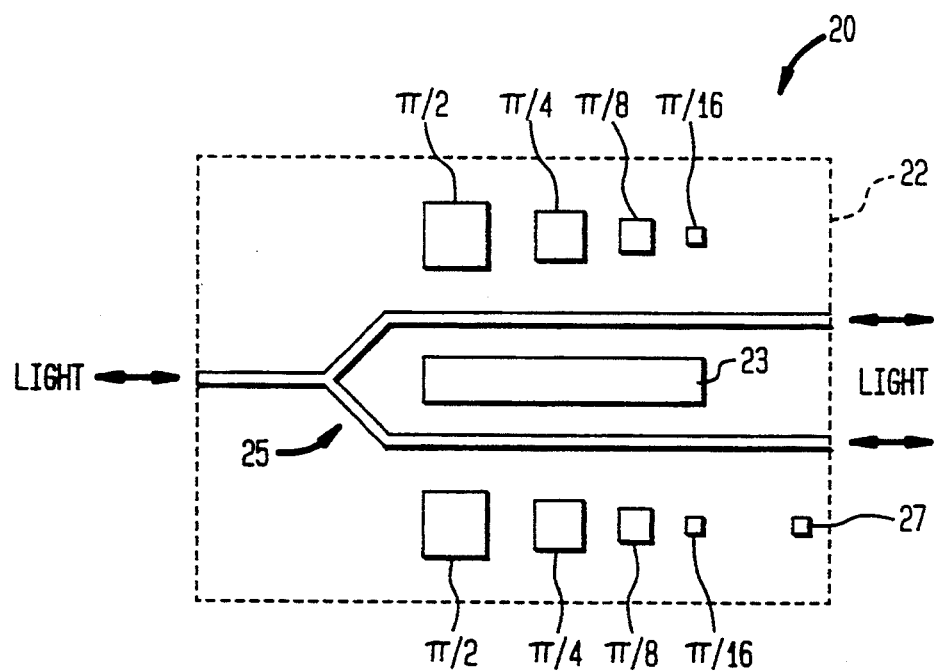
FIG. 3 is a diagrammatic representation of an integrated optics chip embodying the voltage to phase transducer means illustrated generally in FIG. 2.

In order to best understand the invention, reference is first made to FIG. 3 which shows voltage/phase transducer means 20 as including an integrated optics chip (IOC) of a suitable crystal material such as lithium niobate and designated by the numeral 22. In the configuration shown, the effective index of refraction of a confined optical path is increased by the application of a voltage to outside metallization pads designated as $\pi/2$, $\pi/4$, $\pi/8$ and $\pi/16$ relative to a grounded center metallization pad 23. The field pattern within the lithium niobate crystal substrate resulting from this gradient is impressed across the axis of a confined light propagation path 25. An arrangement such as shown and described can be optimized for a nominal center frequency and bandwidth which provides a voltage related effect on the phase of the light waves. In effect then, metallization pads $\pi/2$, $\pi/4$, $\pi/8$ and $\pi/16$ are phase control terminals which are switched from a reference level applied at a pad 27 to a positive voltage to induce a phase change through the aforementioned Pockels electrooptical effect.

Thus, the desired effect is achieved when the field strength and the functional path length of a particular segment is appropriately designed. Fringing between segments is diminished or circumvented by suitably placed reference level guard bands and/or shielding techniques which are not illustrated for purposes of clarity. A given segment will provide a contribution to the total phase delay in accordance with its particular design characteristic whenever a control voltage is applied to it. In the simplified four pad case illustrated in FIG. 3, the arrangement accommodates values of, for example, 90, 45, 22.5 and 11.25 degrees for pads $\pi/2$, $\pi/4$, $\pi/8$ and $\pi/6$, respectively. With the addition of smaller segments, the resolution of the device can be improved with the requirements of the application. The metallization patterns on the crystal substrate appear as small capacitive elements to the interfacing driving circuitry and therefore are not as dissipative as typical high speed digital analog converters, as is advantageous.

It will be appreciated that in order to limit the difference between the smallest and the largest metallization pad, it should be possible to use more than one level of a fixed control voltage. For example, by repeating the above given four pad design and using only one sixteenth the level of applied voltage, the resolution of the combined device is substantially increased to one part in 256.

Figure 4:
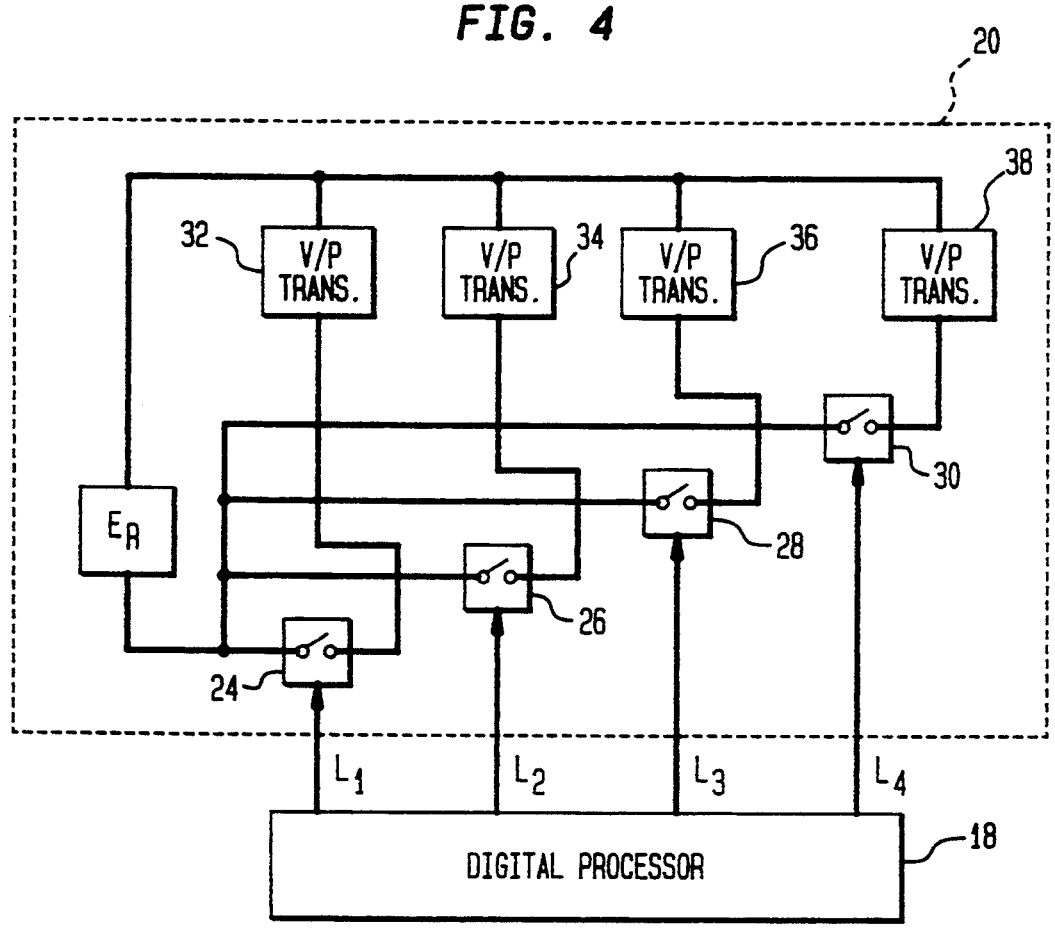
FIG. 4 is a block diagram/electrical schematic more particularly illustrating the voltage to phase transducer means illustrated generally in FIG. 1 and illustrated diagrammatically in FIG. 3.

Voltage/phase transducer means 20 is schematically illustrated in FIG. 4 as including a plurality of normally open logic control switches shown as four in number and designated by the numerals 24, 26, 28 and 30. Least significant bit $L_1$ closes switch 24, bit $L_2$ closes switch 26, bit $L_3$ closes switch 28 and most significant bit $L_4$ closes switch 30. The output of switch 24 drives a voltage/phase transducer 32; the output of switch 26 drives a voltage/phase transducer 34; the output of switch 28 drives a voltage/phase transducer 36; and the output of switch 30 drives a voltage/phase transducer 38. A reference voltage $E_R$ is applied across switches 24, 26, 28 and 30 and voltage/phase transducers 32, 34, 36 and 38, respectively. With the arrangement described, each of the voltage/phase transducers 32, 34, 36 and 38 has a higher gain (typically twice the gain) than the preceding voltage/phase transducer.

Thus, the Pockels electrical optical effect operating in the transverse mode is used in the present invention as a light path phase modulator. An integrated optics chip is designed to exhibit a linear relationship between the level of an applied control voltage and the phase delay imparted to a confined light path. Metallized pads on a prepared substrate are used and are sized and positioned to provide a field strength level and orientation consistent with the intended modulation requirement. A device of the type described eliminates the need for separate digital to analog conversion circuitry, as is desireable.

With the above description of the invention in mind, reference is made to the claims appended hereto for a definition of the scope of the invention.

What is claimed is:

1. In a fiber optic angular rate sensor of the type wherein light from a light source travels around a fiber optic coil in clockwise and counterclockwise directions, and a digital error signal is provided corresponding to the phase difference between the clockwise and counterclockwise traveling light, a phase modulation arrangement comprising:

digital processor means responsive to the error signal applied thereto for providing a plurality of logic bits;

an integrated optics chip having a confined light path for the light traveling around the fiber optic coil and including a corresponding plurality of voltage/phase transducers;

said integrated optics chip further including a corresponding plurality of switching means, wherein each of the switching means switches a respective voltage/phase transducer from an applied reference voltage to a particular voltage level to induce a phase change through Pockels electro-optical effect operating in the transverse mode.

2. In a fiber optic angular rate sensor of the type wherein light from a light source travels around a fiber optic coil in clockwise and counterclockwise directions and a detector detects the clockwise and counterclockwise light and provides an analog electrical error signal corresponding to the phase difference between said clockwise and counterclockwise traveling light, phase modulation means comprising:

an analog to digital converter for converting the analog error signal to a digital signal;

digital processor means connected to the analog to digital converter and responsive to the digital signal therefrom for providing a plurality of logic bits; and voltage/phase transducer means arranged on an integrated optics chip having a confined light path for the light traveling around the fiber optic coil and switching means connected to the digital processor means and responsive to the logic bits provided by said digital processor means for switching the voltage/phase transducer means from an applied reference voltage level to a particular voltage level through Pockels electro-optical effect operating in the transverse mode to induce a phase change.

3. Phase modulation means as described by claim 2, wherein:

the integrated optics chip is arranged to exhibit a linear relationship between the reference voltage level and a phase delay imparted to the confined light path for the light traveling around the fiber optic coil.

4. Phase modulation means as described by claim 3, wherein:

the integrated optics chip includes a substrate and a plurality of phase control terminals and a grounded terminal on the substrate; and the effective index of refraction of the confined light path is increased by the application of the logic bits to respective control terminals so that said terminals are at a particular voltage relative to the grounded terminal.

5. In a fiber optic rate sensor of the type wherein light from a light source travels around a fiber optic coil in clockwise and counterclockwise directions, and an analog electrical error signal is provided corresponding to the phase difference between the clockwise and counterclockwise traveling light, a phase modulation arrangement comprising:

means for converting the analog electrical error signal to a digital signal;

means connected to the converting means for processing the digital signal therefrom to provide a plurality of logic bits;

voltage/phase transducer means arranged as an integrated optics chip having a confined light path for the light traveling around the fiber optic coil;

said voltage/phase transducer means including a plurality of voltage to phase transducers, each of said plurality of transducers having a different gain, and a plurality of switching means;

each of said plurality of switching means being actuated by a logic bit of the plurality of logic bits to activate a corresponding voltage/phase transducer of the plurality of said transducers, whereby said transducers are switched from an applied reference voltage to a particular voltage level to induce a phase change through Pockels electro-optical effect operating in the transverse mode.

6. For a fiber optic angular rate sensor of the type including directing light from a light source for traveling around a fiber optic coil in clockwise and counterclockwise directions, detecting the clockwise and counterclockwise traveling light, and providing an electrical error signal corresponding to the phase difference between said clockwise and counterclockwise traveling light, a phase modulation method comprising:

converting the analog error signal to a digital signal;

processing the digital signal for providing a plurality of logic bits;

arranging voltage/phase transducer means on an integrated optics chip having a confined light path for the light traveling around the fiber optic coil;

arranging switching means on the integrated optics chip in operative relation with the voltage/phase transducer means and the plurality of logic bits; and using the logic bits for actuating the switching means for switching the voltage/phase transducer means from an applied reference voltage level to a particular voltage level through Pockels electro optical effect operating in the transverse mode.

7. A method as described by claim 6, including:

arranging the integrated optics chip for exhibiting a linear relationship between the reference voltage level and a phase delay imparted to the confined light path for the light traveling around the fiber optic coil.

8. A method as described by claim 7, including:

forming the integrated optics chip from a substrate and providing a plurality of phase control terminals and a grounded terminal on the substrate; and applying the logic bits to respective control terminals so that said terminals are at a particular voltage relative to the ground terminal.

* * * * *